United States Patent
Kleiner

(10) Patent No.: US 6,244,961 B1
(45) Date of Patent: Jun. 12, 2001

(54) ARRANGEMENT FOR THE CONTROL OF A ROTATIONAL SHAFT COUPLING FOR A DOBBY AND A ROTATIONAL SHAFT COUPLING WITH AN ARRANGEMENT OF THIS KIND

(75) Inventor: Walter Kleiner, Hirzel (CH)

(73) Assignee: Sulzer Rüti AG, Rüti (CH)

( * ) Notice: Subject to any disclaimer, the term of this patent is extended or adjusted under 35 U.S.C. 154(b) by 0 days.

(21) Appl. No.: 09/427,840

(22) Filed: Oct. 26, 1999

(30) Foreign Application Priority Data

Nov. 4, 1998 (EP) .................................................. 98811103

(51) Int. Cl.[7] ...................................................... F16D 7/04
(52) U.S. Cl. ................................... 464/37; 464/30; 139/76
(58) Field of Search ........................... 464/37, 30; 139/76, 139/66 R, 66 A, 79

(56) References Cited

U.S. PATENT DOCUMENTS

| 4,387,741 | * | 6/1983 | Palau et al. | 139/66 R |
| 4,763,697 | * | 8/1988 | Serturini | 139/66 R |
| 4,905,738 | * | 3/1990 | Kleiner | 139/76 |
| 5,479,964 | * | 1/1996 | Burigana | 139/76 |

FOREIGN PATENT DOCUMENTS

| 0234321A1 | 9/1987 | (EP) . |
| 0274119A2 | 7/1988 | (EP) . |
| 7166444 | 6/1995 | (JP) . |
| 8296143 | 12/1996 | (JP) . |

* cited by examiner

*Primary Examiner*—Lynne H. Browne
*Assistant Examiner*—Aaron Dunwoody
(74) *Attorney, Agent, or Firm*—Townsend and Townsend and Crew LLP

(57) ABSTRACT

The arrangement contains a carrier (4) which is mounted in a drive shaft (1) which is formed as a hollow shaft with holes (10) which are arranged in a radial plane, two switching tappets (5) which are displaceably arranged in the holes, two control members (7) which can be brought into operative engagement with the switching tappets, means (8) for the actuation of the control members and two resetting elements (9) for the control members (7). The control members are displaceable in the carrier with respect to the drive shaft into a first position in order to switch the coupling apparatus into a drive position and into a second position in order to switch the coupling apparatus into an idling position. The resetting members (9) are arranged inside the drive shaft (1) in order to displace the control members (7) into the second position. With this arrangement the resetting of the control members is ensured. In a coupling apparatus for a rotational dobby with an apparatus of this kind two followers are provided for the coupling of the drive shaft with the eccentric disc which can be brought into and out of engagement at the same time in order to divide up the holding force acting on the follower.

10 Claims, 5 Drawing Sheets

ARRANGEMENT FOR THE CONTROL OF A ROTATIONAL SHAFT COUPLING FOR A DOBBY AND A ROTATIONAL SHAFT COUPLING WITH AN ARRANGEMENT OF THIS KIND

The invention relates to an arrangement for the control of a rotational shaft coupling for a dobby.

BACKGROUND OF THE INVENTION

An arrangement for the control of a coupling apparatus is described in JP-8-296 143. This reference has a carrier which is stationary arranged inside a drive shaft. The drive shaft is formed as a hollow shaft with two holes that are arranged in a radial plane. Two switching tappets are arranged in the holes. Two control members are radially displaceable in the carrier with respect to the drive shaft. A two-way valve alternately actuates the control members. The control member is designed as a simply acting working cylinder with a piston that is under a spring action.

In this control member the piston is reset by means of the spring after the switching off or on of the valve has been completed. The working cylinder is ventilated at the same time switching occurs. With the rapid switching changes this proves to be disadvantageous.

SUMMARY OF THE INVENTION

The object of the invention is to improve an arrangement for the control of a coupling apparatus for a rotational dobby. A carrier (4) is stationarily arranged in a drive shaft (1) that is formed as a hollow shaft with holes (10) which are arranged in a radial plane. Two switching tappets (5) having two control members (7) which can be brought into operative engagement with the switching tappets are radially displaceable in the carrier with respect to the drive shaft. The two switching tappets (5) switch into a first position in order to switch the coupling apparatus into a drive position and into a second position in order to switch the coupling apparatus into an idling position. Pneumatic and magnetic valves (8; 43, 44) for the actuation of the control members are utilized. Two resetting elements (9) are provided inside the drive shaft (1) in order to displace the control members (7) into the second position.

The advantage which can be achieved with the invention is substantially to be seen in that the resetting of the piston is ensured in a form locked manner within a small angle of rotation of the drive shaft.

The coupling apparatus for the rotational dobby includes an eccentric disc (22) that is arranged on a drive shaft (1) that is formed as a hollow shaft. The hollow shaft has holes (10) that lie in a radial plane. A connecting rod (23) that is rotates is located at the periphery of the eccentric disc. This eccentric disc includes at least one follower (24) that is moveable with respect to the eccentric disc. Each switching tappet (5) can move in contact at these followers for the purpose of the latching in or latching out respectively of the coupling elements (24, 25). A coupling ring (21) with two cut-outs (27) that are formed to lie diametrically oppositely is arranged on the drive shaft (1) in such a manner that the cut-outs are oriented with the holes (10). The two coupling elements (24, 25) can in each case be latched in or out respectively into one of the cut-outs (27), usually at the same time, in order to couple or de-couple the eccentric disc (22) with the drive shaft (1).

This coupling apparatus has the advantage that the holding force is uniformly distributed over the pawls through the use of two pawls and the simultaneous latching in of the two pawls.

BRIEF DESCRIPTION OF THE DRAWINGS

The following the invention will be described with reference to the accompanying drawings in which.

DESCRIPTION OF THE SPECIFIC EMBODIMENTS

Rotational dobbies that have a coupling apparatus for each heald frame are used for the shed forming in weaving machines. The coupling apparatuses are arranged adjacently on a drive shaft and are individually controlled in order to actuate the heald frame in accordance with predetermined pattern data. The coupling apparatus is arranged on a drive shaft that is a hollow shaft. The hollow shaft contains the arrangement being discussed here.

The drive shaft rotates intermittently, i.e., after a half rotation phase of 180° here follows a standstill phase in which the coupling apparatuses are excited for coupling in or out. Then the next half rotation phase of 180° follows, and so forth.

Figure 1:
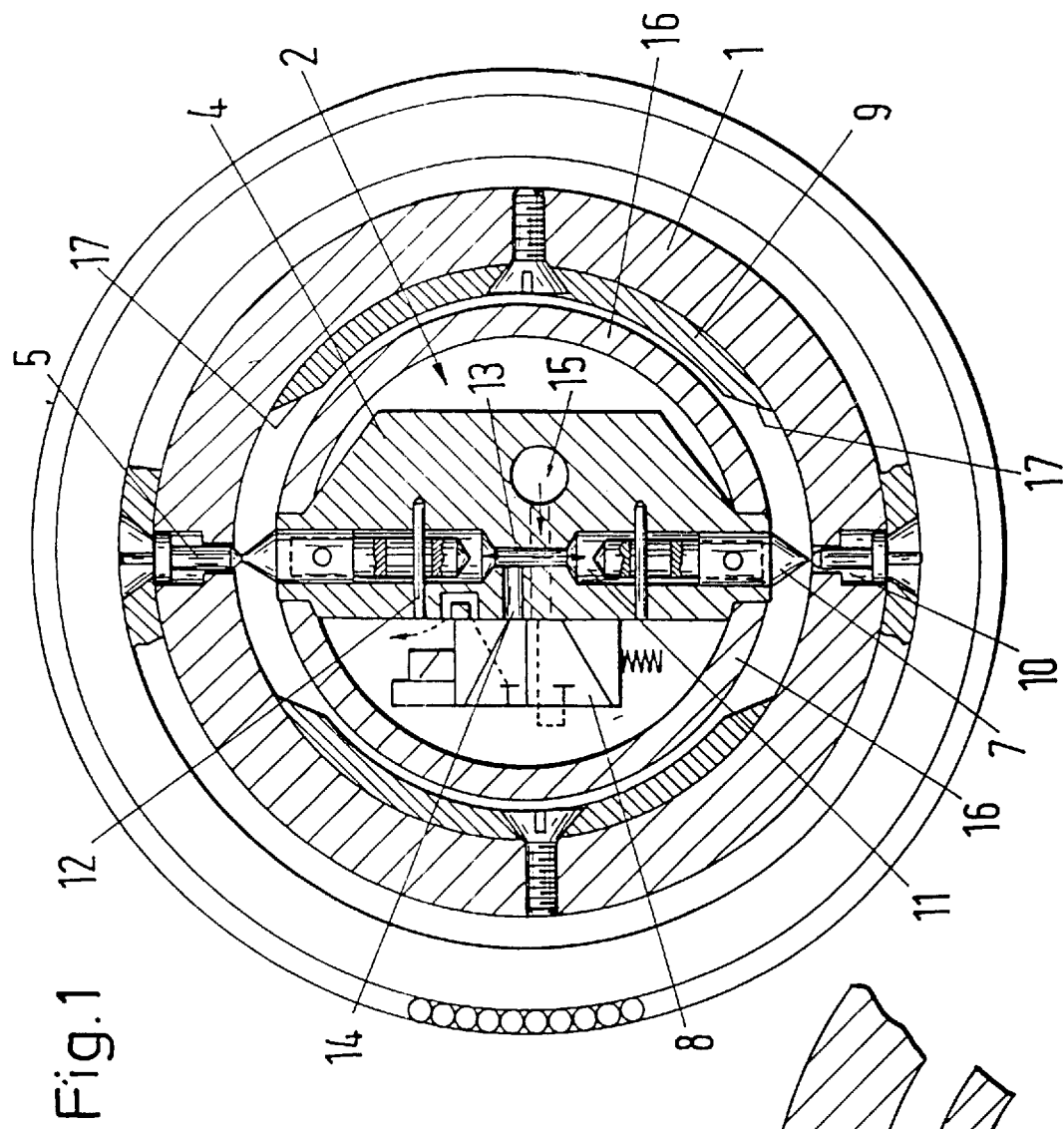
FIG. 1 is an embodiment of an arrangement in accordance with the invention in section.
Figure 2:
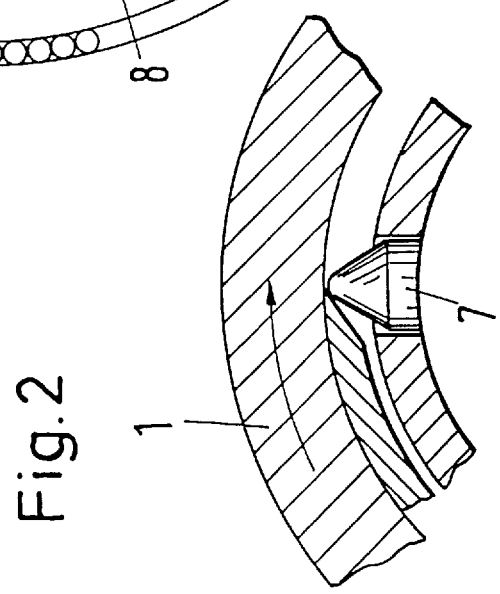
FIG. 2 is a different detail of the arrangement on a larger scale.

FIG. 1 shows the drive shaft 1 in the standstill phase with the arrangement. The arrangement comprises an elongate carrier 4 and, for each adjacently arranged coupling apparatus, two switching tappets 5, two control members 7, a magnetic valve 8 and two resetting elements 9. The switching tappets 5 are displaceable along holes 10 that are formed in the wall of the drive shaft along a radial plane. The carrier 4 has two bores 11 that are formed to lie diametrically oppositely and are arranged inside the drive shaft in such a manner that the bores 11 are directed to the holes 10 in the wall of the drive shaft during the standstill phase. The control members 7 are arranged in the bores 11 and form working cylinders with the latter in each case, with an abutment 12 being provided in order to limit the stroke of the control member 7. The magnetic valve 8 is secured to the carrier 4. In the carrier 4 is formed a passage 13 that connects the working cylinders to one another, a coupling passage 14 that connects the passage 13 to the magnetic valve and a feeder passage 15. The resetting elements 9 are designed as circular-arc-shaped segments with ramps 17 which are secured so as to lie diametrically oppositely at the inner surface of the drive shaft 1. The carrier 4 is provided with coverings 16 at the longitudinal sides.

FIG. 1 shows the arrangement in the standstill phase in which the magnetic valve 8 is opened through a switching command and the working cylinders are charged with compressed air. The control members project out of the carrier and the switching tappets 5 in the holes 10 are thrust radially outwardly. The switching command for the magnetic valves is now maintained briefly beyond the standstill phase. If this switching command is withdrawn, then the magnetic valve 8 closes and the working cylinder is ventilated via the magnetic valve 8. Through the rotation of the drive shaft that begins after the standstill phase the control members are brought into contact with the resetting elements 9 and are reset by the ramp 17 (FIG. 1). An advantage is that the ventilation of the working cylinders is assisted.

Figure 3:
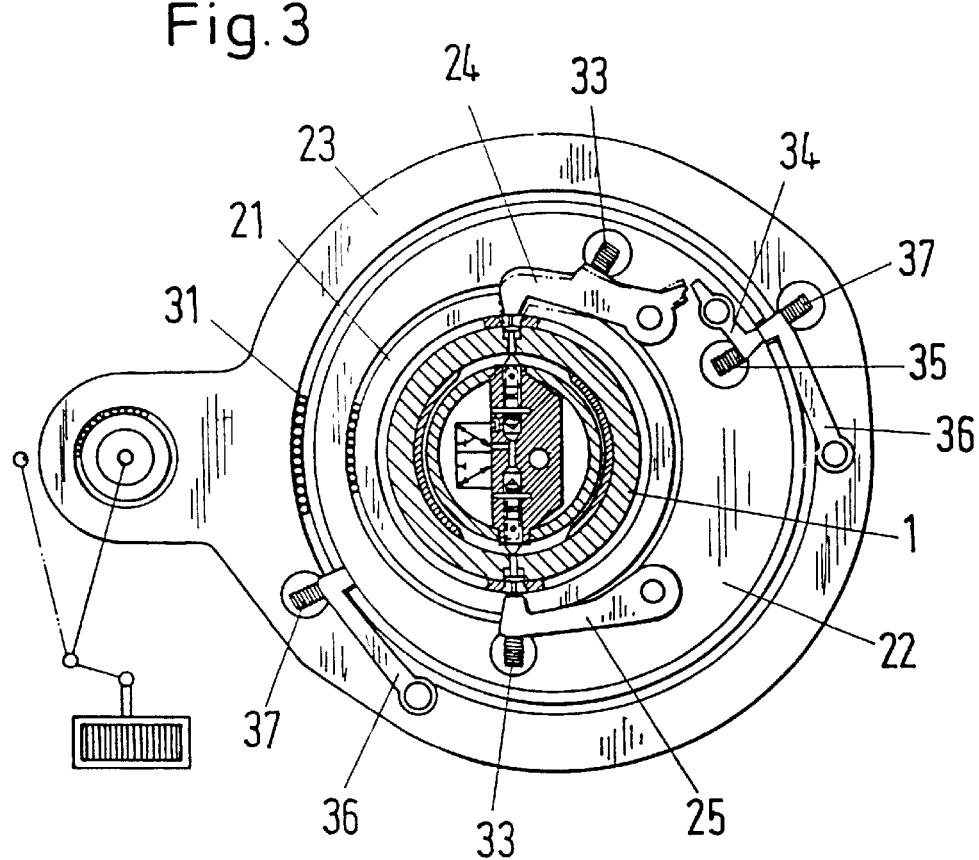
FIG. 3 is an embodiment of a coupling apparatus in accordance with the invention for a rotational dobby with the arrangement in accordance with FIG. 1 in the idling position.
Figure 4:
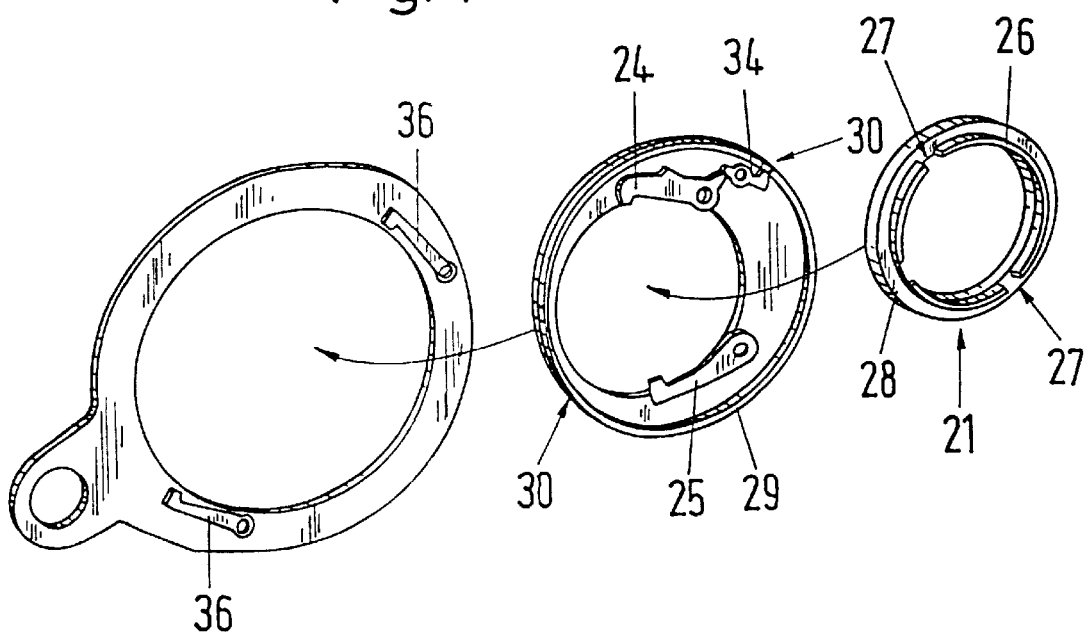
FIG. 4 is a spatial illustration of the coupling elements in accordance with FIG. 3.
Figure 5:
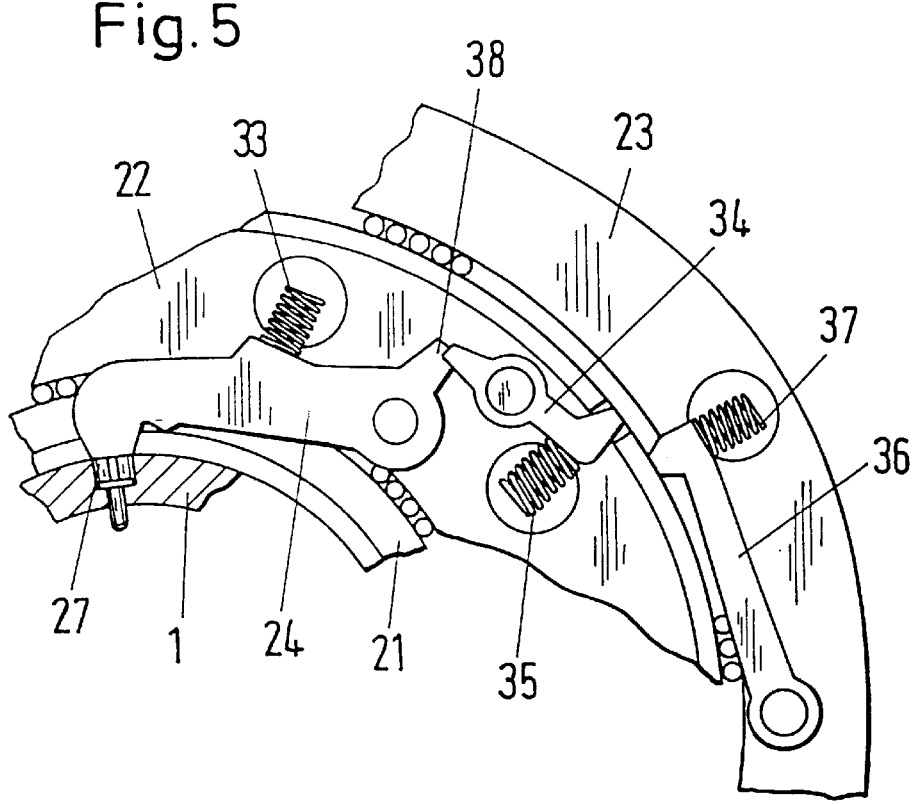
FIG. 5 is a section of the coupling apparatus with an activated blocking lever.

Reference is made to FIGS. 3 and 4. The coupling apparatus consists of a coupling ring 21, an eccentric disc 22, a connecting rod 23 and coupling elements 24, 25. The coupling ring 21 consists of a first section 26 with two diametrically arranged cut-outs 27 and a second section 28 (FIG. 4). The coupling ring is secured on the drive shaft 1 and is arranged in such a manner that the cut-outs 27 of the first section 26 are directed to the holes 10 that are formed in the drive shaft. The eccentric disc 22 is journalled for rotation at the periphery of the second section 28 of the coupling ring 21 by means of balls 31 (FIG. 3). The eccentric disc 22 has at its periphery an attachment 29 that is axially directed and that is provided with two cut-outs 30 (FIG. 5). The connecting rod 23 is journalled at the periphery of the eccentric disc 22 by means of balls 32. The coupling elements comprise a pawl 24 and an auxiliary pawl 25 that are pivotally arranged on the same side of the eccentric disc 22 in a mirror imaged manner. The pawl 24 and the auxiliary pawl 25 are in each case biased by a spring 33 against the first section 26 of the coupling ring 21 and can be brought into and out of engagement with the cut-outs 27.

With reference to FIG. 5, a blocking lever 34 pivots with respect to the eccentric disc 22 and presses through the spring 35 against the pawl 24 with an extension 38. The blocking lever blocks the coupling element in a form locked manner such that it can not pivot out from the cut-out 27 during the half rotation phase of the drive shaft 1.

Figure 6:
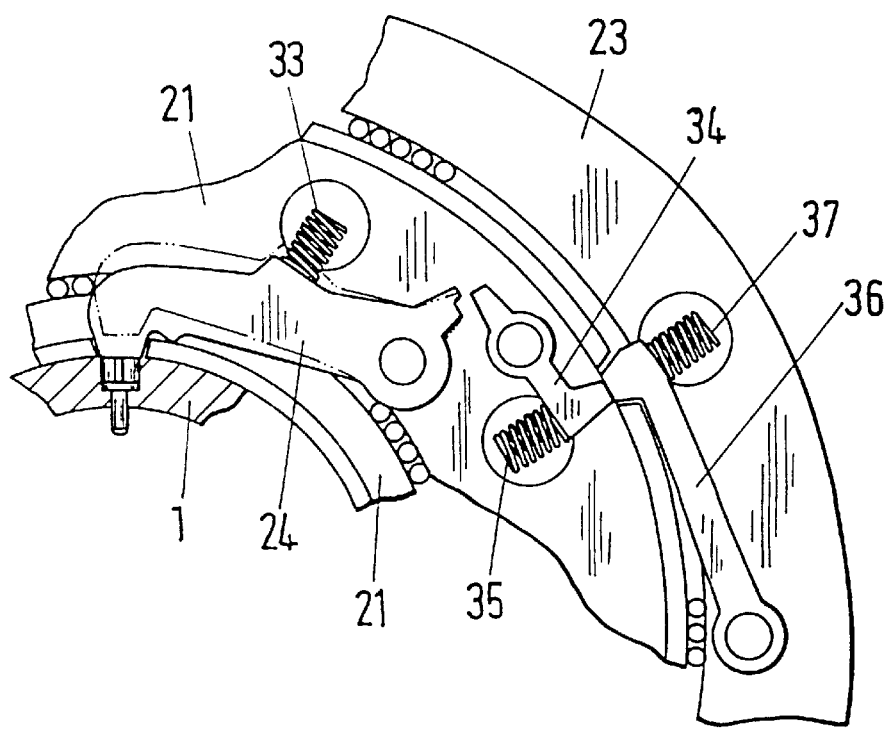
FIG. 6 is a section of the coupling apparatus with a deactivated blocking lever.

In the standstill phase of the drive shaft, the levers 36, pivoting on the connecting rod 23, are pressed by means of springs 37 under a bias force into the cut-out 30 of the eccentric disc. The pivoting of levers 36 causes the blocking lever 34 to be pivoted out of the contact region of the extension 38, and the coupling element 24 can thereby be excited by the switching tappet 5 (FIG. 6).

In the following the function of the coupling apparatus is described. FIG. 3 shows the coupling apparatus in the standstill phase of the drive shaft in which, as a result of a control command, the control members 7 are displaced radially outwardly and the switching tappets 5 are arranged in the cut-outs 27. The levers 36 are latched in as a result of the force of the spring 37 into the cut-outs 30 in the eccentric disc 22. Through this, on the one hand, the connecting rod 23 and the eccentric disc 22 are brought into engagement with one another and, on the other hand, the blocking lever 34 and the pawl 24 are brought out of engagement. In this position the coupling elements 24, 25 are pressed with the force of the springs 33 against the switching tappets 5. This prevents a latching in of the coupling elements into the cut-outs 27 in the coupling ring 21 so that the drive shaft 1 rotates freely and the coupling apparatus stands in the idling position. FIG. 3 shows a position after a few angular degrees of the clockwise rotation of the hollow shaft.

Figure 7:
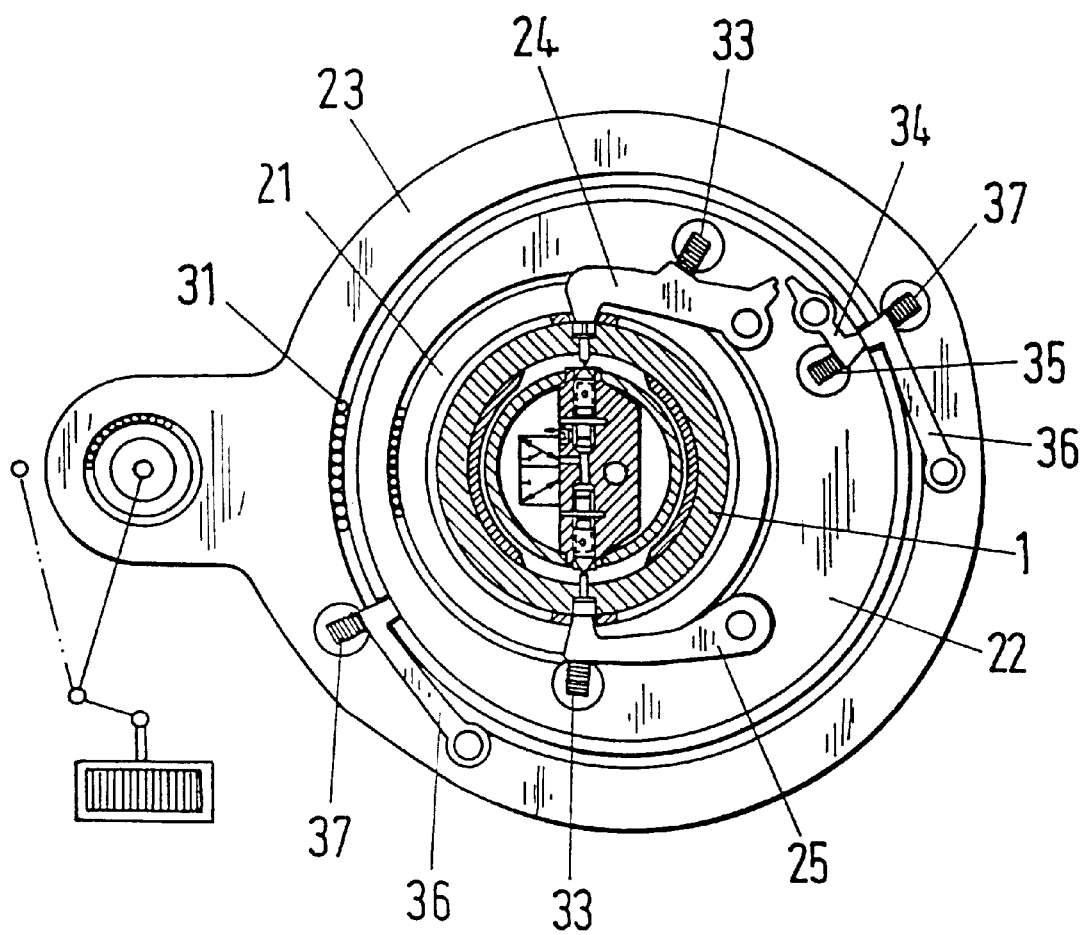
FIG. 7 is a view of the coupling apparatus in accordance with FIG. 3 showing the coupling in the drive position.

FIG. 7 shows the coupling apparatus in the standstill phase of the drive shaft as a result of the absence of a control command. The control members 7, which are radially inwardly displaced by means of the resetting elements 9, are arranged inside the carrier 4 and the switching tappets 5 are arranged in the holes 10 of the drive shaft 1. In this position, the coupling elements 24, 25 are latched in with the force of the springs 33 into the cut-outs 27 in the coupling ring 21. In the half rotation phase of the drive shaft 1 beginning after the standstill phase, the levers 36 are lifted out of the cut-outs 30 of the eccentric disc 22. The blocking lever 34 follows this movement and pivots in into the cut-outs 30 and comes into engagement with the extension 38 of the coupling element 24. Through this in an advantageous manner the connection between the drive shaft 1 and the eccentric disc 22 is secured in a form locked manner. FIG. 5 shows a position after a few angular degrees of the hollow shaft together with the eccentric disc.

Figure 8:
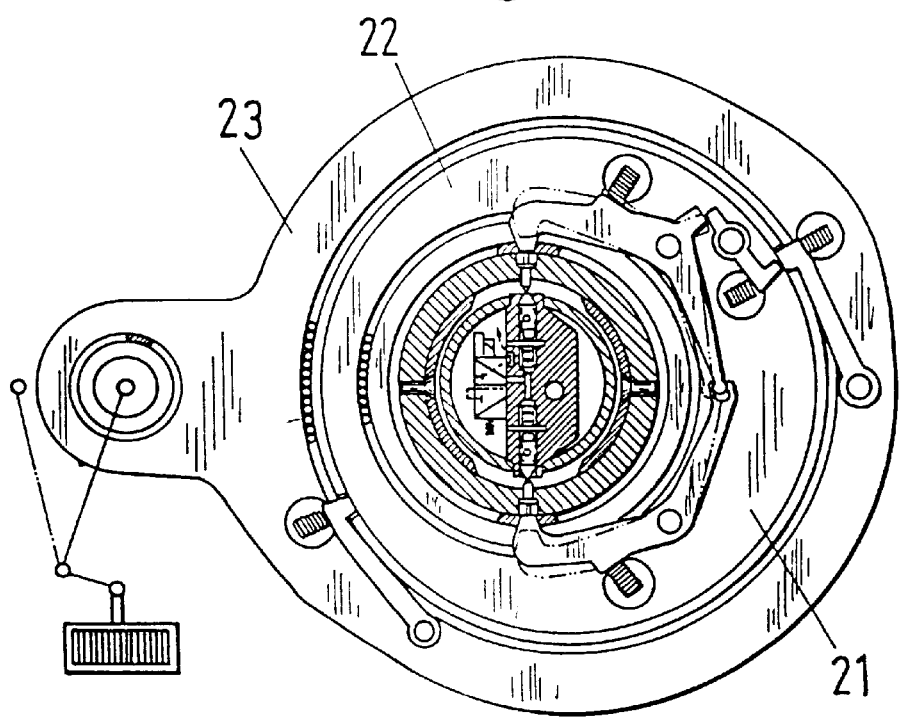
FIG. 8 is a second embodiment of a coupling apparatus in accordance with the invention for a rotational dobby with an arrangement in accordance with FIG. 1; and, FIG. 9 is a third embodiment of an arrangement in accordance with the invention.

The embodiment shown in FIG. 8 differs from that in accordance with FIGS. 3 to 5 only through the design of the coupling elements, which are coupled in a manner which is known per se, through which an ideal synchronization of the pawl movements can be achieved.

Figure 9:
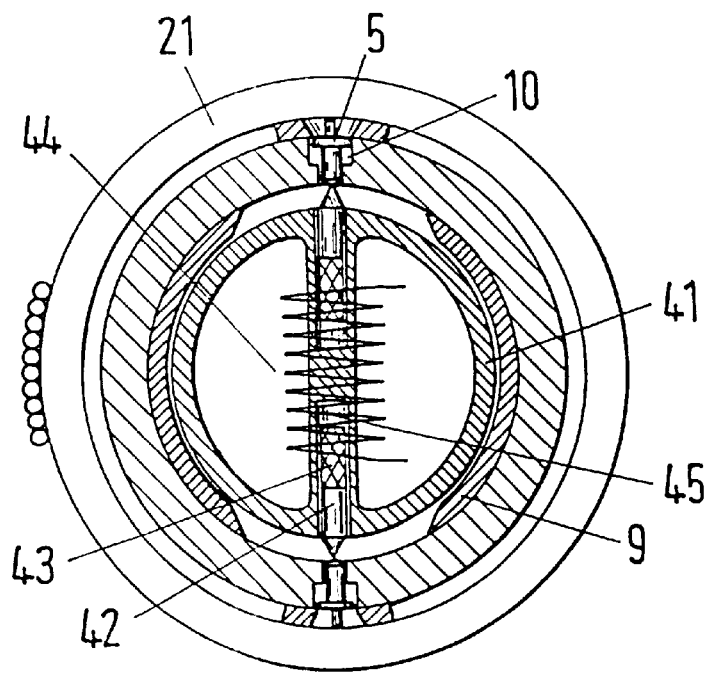

FIG. 9 shows an embodiment with a carrier 41, with two control members 42, with two permanent magnets 43 and with a winding 44. The carrier 41 has two blind bores 45 that are accessible from the outside. A control member 42 and a permanent magnet 43 move radially back and forth are in each case arranged in each of the blind bores 45. For this the permanent magnets are arranged in such a manner that different magnetic poles lie opposite to one another. This causes the control members 42 to move radially outwardly or inwardly respectively through the reversal of the magnetic flux.

The arrangement contains a carrier 4 that is mounted in a drive shaft 1 which is formed as a hollow shaft. Holes 10 are arranged in a radial plane, two switching tappets 5 are displaced in the holes, and two control members 7 can be brought into operative engagement with the switching tappets. Valves 8 for the actuation of the control members and two resetting elements 9 for the control members are shown. The control members are displaceable in the carrier with respect to the drive shaft into a first position in order to switch the coupling apparatus into a drive position and into a second position in order to switch the coupling apparatus into an idling position. The resetting members 9 are arranged inside the drive shaft 1 in order to displace the control members 7 into the second position.

With this arrangement the resetting of the control members is ensured.

In a coupling apparatus for a rotational dobby with an apparatus of this kind, two followers are provided for the coupling of the drive shaft with the eccentric disc. These coupling members can be brought into and out of engagement at the same time in order to divide up the holding force acting on the follower.

What is claimed is:

1. Arrangement for the control of a coupling apparatus for a rotational dobby, comprising a carrier (4) which is stationarily arranged in a drive shaft (1) which is formed as a hollow shaft with holes (10) which are arranged in a radial plane, comprising two switching tappets (5), comprising two control members (7) which can be brought into operative engagement with the switching tappets and which are radially displaceable in the carrier with respect to the drive shaft into a first position in order to switch the coupling apparatus into a drive position and into a second position in order to switch the coupling apparatus into an idling position and comprising a means (8; 43, 44) for the actuation of the control members, characterized in that two resetting means (9) are provided inside the drive shaft (1) in order to displace the control members (7) into the second position.

2. Arrangement in accordance with claim 1, characterized in that the resetting means (9) is a circular-arc-shaped section or segment which is provided at the inner surface of the drive shaft (1); and in that each resetting means has two ramps (17) for the actuation of the control members.

3. Arrangement in accordance with claim 1, characterized in that the control members (7) are arranged in the carrier (4) in such a manner that they can be displaced in opposite senses.

4. Arrangement in accordance with claim 1, characterized in that the control members (7) are designed as simply acting cylinders with pistons.

5. Arrangement in accordance with claim 1, characterized in that the means for the actuation of the control member is a magnetic valve (8) which is intended for actuating the control members (7) at the same time.

6. Arrangement in accordance with claim 1, characterized in that the means for the actuation of the control members (42) comprises a winding (44) for the production of a magnetic field and two permanent magnets (43); and in that the control members and the permanent magnets are in each case arranged in a blind bore (45) in such a manner that opposite magnetic poles lie opposite to one another.

7. Coupling apparatus for a rotational dobby, comprising an eccentric disc (22) which is arranged on a drive shaft (1) which is formed as a hollow shaft with holes (10) which lie in a radial plane, comprising a connecting rod (23) which is rotatably arranged at the periphery of the eccentric disc, comprising at least one follower (24) which is movably arranged at the eccentric disc, with each switching tappet (5) lying in contact at these followers for the purpose of the latching, in or latching out respectively of coupling elements (24, 25) and comprising an arrangement in accordance with claim 1, characterized in that a coupling ring (21) with two cut-outs (27) which are formed to lie diametrically oppositely is arranged on the drive shaft (1) in such a manner that the cut-outs are oriented with the holes (10); and in that two coupling elements (24,25) are provided which can in each case be latched in or out respectively into one of the cut-outs (27) at the same time in order to couple the eccentric disc (22) with the drive shaft (1) or to decouple them respectively.

8. Apparatus in accordance with claim 7, characterized in that the coupling elements are formed as a pawl (24) and an auxiliary pawl (25) which are pivotally arranged at the eccentric disc (22); and in that a spring (33) is associated in each case with the pawl and the auxiliary pawl (24; 25) in order to bias the pawls against the coupling ring (21).

9. Apparatus in accordance with claim 7, characterized by a blocking lever (34) which is associated with the pawl (24) and which can be brought into engagement with the latter in order to prevent a movement of the pawl (24).

10. Apparatus in accordance with claim 7, characterized in that two levers (36) which are pivotally arranged at the connecting rod (2) and can be brought into engagement with the eccentric disc (22) in order to prevent a rotation of the eccentric disc in the idling position.

\* \* \* \* \*